United States Patent Office 3,296,184
Patented Jan. 3, 1967

3,296,184
VULCANIZABLE COMPOSITIONS OF OLEFIN POLYMERS OR COPOLYMERS AND VULCANIZED ARTICLES OBTAINED THEREFROM
Augusto Portolani, Giuliano Ballini, and Carlo Bujtar, Ferrara, and Cesare Augusto Peri and Spartaco Fontani, Milan, Italy, assignors to Montecatini Societa Generale per l'Industria Mineraria e Chimica, Milan, Italy
No Drawing. Filed Feb. 11, 1964, Ser. No. 343,950
Claims priority, application Italy, Feb. 14, 1963, 3,038/63; June 27, 1963, 13,442/63
33 Claims. (Cl. 260—41)

This invention relates to vulcanizable compositions comprising an olefin polymer or a coplymer of ethylene with an alpha-olefin, a reinforcing filler, and an organic peroxide selected from a class of peroxides having particular characteristics.

The use of organic peroxides as cross-linking agents for olefin polymers and copolymers of ethylene with alpha-olefins is already known. More particularly, the use of monoperoxides, and of diperoxides such as dicumylperoxide, di-tert. butylperoxide and tert. butylcumylperoxide, in the vulcanization of the same olefin polymers or coplymers has already been described. These percompounds have relatively low decomposition rates, which determine vulvanization times, and which rates are remarkably higher than those used for unsaturated elastomers vulcanized with sulfur and accelerators. When speaking of these rates, it is of course understood that these are the rates when the optimum of the physical properties are desired. When using these elastomers charged with carbon black and these alkyl- or (aryl) alkyl-peroxides, it was not possible to obtain a higher vulcanization rate, except by increasing the vulcanization temperature.

Peroxides having a lower "half-life" (semidecomposition time) and, therefore, a higher vulcanization rate are known. These are some di-aroyl peroxides and tert. alkyl peresters, such as di-benzoyl-peroxide and tert. butylperbenzoate. These peroxides, however, exhibit the inconveniences of being sensitive to the carbon black reinforcing fillers, which remarkably reduce or annul the vulcanizing activity and, therefore, find a very limited use in the peroxidic vulcanization of natural or synthetic elastomeric substances.

An object of this invention is a vulcanizable composition of olefin polymers or copolymers containing a reinforcing filler and a peroxide which has a very high vulcanization rate and is not sensitive to the negative influence of the reinforcing fillers, and more particularly is not sensitive to the negative influence of carbon black fillers.

Another object of this invention are the vulcanized articles obtained from said compositions.

The vulcanizable compositions, according to this invention, are characterized in that they contain, together with the olefin polymer and/or copolymer, and with the relative reinforcing filler, a peroxidic compound having a di-perketalic structure of the general formula

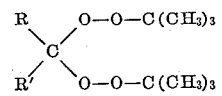

wherein R and R' can be alkyls, (aryl)alkyls, substituted alkyls, saturated or unsaturated cycloalkyl (perketals), or R can be one of the aforementioned radicals and R' is hydrogen, or R and R' are hydrogen atoms (peracetals); or a double di-perketalic structure corresponding to a tetraperoxide having the formula

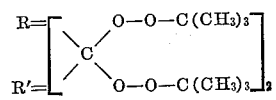

in which R and R' are the same or different bivalent alkylenic radicals containing from 2 to 8 carbon atoms and the resulting cyclic structure may contain from 6 to 12 carbon atoms in total.

These peroxidic compounds vulcanize olefin polymers and copolymers with higher rates than alkyl and aralkyl peroxides and with rates comparable with those of peresters. They furthermore offer the advantage of showing an unaltered, or even increased, vulcanizing activity in the presence of carbon black. This last characteristic which represents the fundamental feature of our invention, is surprising since it is known that, in the vulcanization of natural rubbers, the addition of various types of carbon black in mixes containing 2,2-bis(tert. butyl-peroxy)-butane (one of the most common peroxides belonging to the aforementioned class) gives products of no importance from a practical point of view. This is analogous with what occurs when using tert. butyl-perbenzoate instead of 2,2-bis(tert. butyl-peroxy)butane in the vulcanization of natural rubbers.

It has, in fact, been surprisingly found that in the case of olefin polymers and copolymers containing a carbon black reinforcing filler, the peroxy compounds of this invention give vulcanized products having physical characteristics corresponding to those obtainable with alkyl and aralkyl peroxides, with remarkably lower vulcanization times at the same temperature, or with remarkably lower temperatures for the same vulcanization time.

These peroxidic compounds are further characterized by their insensibility to the white fillers of non-acidic type (calcined silica, talc, litopone, etc.). With the white fillers of acidic type (clays, hydrated silica, coalin, etc.), however, it is necessary to add moderate amounts of basic organic or inorganic correctives (metal oxides, amines, glycols, etc.) in order to obtain excellent vulcanizates.

The peroxidic compounds of this class are obtained by known methods and are the reaction products of tert. butyl-hydroperoxide with ketones (perketals) or with aldehydes (peracetals). More particularly, from each carbonyl group two peroxidic groups are generated and, therefore, diperoxides are obtained from monoketones and aldehydes, while tetraperoxides are obtained from cyclid diketones. A detailed mode of preparation is hereinafter given by way of example. This class comprises, e.g., the following peroxides:

2,2-bis (tert. butyl-peroxy)propane
2,2-bis (tert. butyl-peroxy)-3-chloropropane
2,2-bis (tert. butyl-peroxy)-1,3-dichloropropane
2,2-bis (tert. butyl-peroxy)-3-phenyl-propane
2,2-bis (tert. butyl-peroxy)-butane
2,2-bis (tert. butyl-peroxy)pentanone-4
2,2-bis (tert. butyl-peroxy)-3-benzoyl-propane
1,1-bis (tert. butyl-peroxy) ethane
alpha, alpha-bis (tert. butyl-peroxy) toluene
bis (tert. butyl-peroxy)-(2 furyl) methane
bis (tert. butyl-peroxy) methane
alpha, alpha-bis (tert. butyl-peroxy) ethyl-benzene
alpha, alpha-bis (tert. butyl-peroxy) diphenyl-methane
alpha, adpha-bis (tert. butyl-peroxy) 2-ethyl-furane
1,1,4,4-tetra (tert. butyl-peroxy) cyclohexane
1,1,5,5-tetra (tert. butyl-peroxy) cyclooctane
1,1,7,7-tetra (tert. butyl-peroxy) cyclododecane
1,1,4,4-tetra (tert. butyl-peroxy) cyclododecane Among the advantages offered by the use of the above peroxides in the vulcanization of olefin polymers or copolymers, more particularly of ethylene-alpha-olefin copolymers, are:

(1) The possibility of using, at the same temperatures, vulcanization times lower than those heretofore used with alkyl or aralkyl peroxides resistant to carbon black, or, at the same vulcanization times, the possibility of employing lower vulcanization temperatures.

(2) The possibility of using carbon black in the mixes with no detrimental decrease or disappearance of the peroxide activity.

(3) The initial odor of the products vulcanized with these peroxides is lower than the odor of the vulcanizates obtained with peroxides containing aryl groups, and disappears more quickly.

The mixes containing said peroxides can be extruded and calendered at temperatures usually used in the rubber industry and, in spite of the higher vulcanization rates, the vulcanized manufactured articles do not present blisters nor are they scorched.

The amount of perketales or peracetales contained in the vulcanizable compositions of this invention are between 0.002 and 0.1, and preferably between 0.01 and 0.03 mols per 100 g. of polymer or copolymer. Any amount of carbon black may be present within the limits of its physical compatibility with the polymeric material.

The tetraperoxides and the following diperoxides are new products:

1,1-bis(tert.butyl-peroxy)-ethane, 2,2-bis(tert.butyl-peroxy)-3-chloro-propane, 2,2-bis(tert.butyl-peroxy)-3-phenyl-propane, 2,2-bis(tert.butyl-peroxy)-3-benzoyl-propane and bis(tert.butyl-peroxy)-(2-furyl)-methane. These new tetraperoxides and the new diperoxides, which have substituents attached to the central hydrocarbon radical, exhibit the advantage, with respect to the known non-substituted diperoxides, of being more easily handled since they are more stable to impact and explosion and are less volatile and therefore more easily incorporated into the mixes of ethylene-propylene copolymers.

The general characteristics of all olefin polymers and ethylene-alpha olefin copolymers vulcanized with peroxides of this invention and the effectiveness of the vulcanization are increased by having present in the mix auxiliary substances such as sulfur, quinonic compounds, vinyl and divinyl monomers, allyl and polyallyl monomers, polymers containing vinylic unsaturations, dimaleimides, furfural and its derivatives, generally in concentrations between 0.01 and 10, and preferably between 0.3 and 3 parts per 100 parts of polymer or copolymer.

A further feature of this invention is that in the vulcanization of olefin polymers and ethylene-alpha olefin copolymers with perketals or with peracetals in accordance with this invention, it has been observed that the addition of an inorganic or an organic base, preferably diphenylguanidine, in addition to the aforementioned auxiliary substances, causes a further remarkable improvement in the properties of the vulcanizates. The amount of inorganic base (e.g. metal oxides such as ZnO) or of organic base (e.g. triethanolamine) can be between 0.1 and 10 parts per 100 parts by weight of polymer or copolymer.

The compositions of this invention may also contain the additives, plasticizers and antioxidants commonly used in the rubber industry. The mixtures of polymers or copolymers with the carbon black reinforcing fillers, the perketals and possibly the aforementioned auxiliary substances are prepared with apparatus commonly used for mechanical mixing in the rubber industry.

The vulcanization of the mix can be carried out in a press in the presence of steam, or in a fluid bath, according to the known methods generally used in the rubber industry.

The peroxides of this invention are also suitable for the covulcanization of mixes containing saturated ethylene-alpha-olefin copolymers and other saturated or unsaturated elastomers, without any limits but those imposed by the possibility of these elastomers being vulcanized with organic peroxides.

Moreover they can be used in admixture with other peroxides and can be added to the mix in the pure state, or dissolved in suitable solvents, or diluted with inert mineral substances.

Particularly advantageous results are obtained by using the peroxides of this invention in the vulcanization of saturated amorphous copolymers of ethylene with propylene and/or butene. The copolymers used preferably have a molar ethylene content of between 20 and 80% and a Mooney viscosity ML (1+4 at 100° C.) preferably between 20 and 80.

The following examples are intended to better illustrate the invention without limiting its scope.

EXAMPLE 1

From an ethylene-propylene copolymer containing 45% by mols of propylene and having a Mooney viscosity ML (1+4 at 100° C.) of 20, the mixes of Table 1 were prepared in a roll mixer. These mixes were then vulcanized in a press into sheets having a size of 120 x 120 x 2 mm.

From these sheets specimens of the C type (ASTM D 412) were prepared and subjected to tensile tests in a dinamometer of the Amsler type with a rate of separation of the grips of 500 mm. per minute, in order to determine the tensile strength, the elongation at break and the modulus at an elongation of 200% and 300%.

Table 1

| | 1 | 2 | 3 | 4 | 5 | 6 | 7 | 8 | 9 | 10 | 11 | 12 |
|---|---|---|---|---|---|---|---|---|---|---|---|---|
| Compositions of the mix (parts by weight): | | | | | | | | | | | | |
| Ethylene-propylene copolymer | 100 | 100 | 100 | 100 | 100 | 100 | 100 | 100 | 100 | 100 | 100 | 100 |
| HAF carbon black (High Abrasion Furnace) | 50 | 50 | 50 | 50 | 50 | 50 | 50 | 50 | 50 | 50 | 50 | 50 |
| Sulfur | 0.32 | 0.32 | 0.32 | 0.32 | 0.32 | 0.32 | 0.32 | 0.32 | 0.32 | 0.32 | 0.32 | 0.32 |
| 2,2-bis(tert.butyl-peroxy)propane | 2.2 | | | | | | | | | | | |
| 2,2-bis(tert.butyl-peroxy)3-chloropropane | | 5.1 | | | | | | | | | | |
| 2,2-bis(tert.butyl-peroxy)butane | | | 3.5 | | | | | | | | | |
| 2,2-bis(tert.butyl-peroxy)pentanone-4 | | | | 5.2 | 5.2 | | | | | | | |
| 2,2-bis(tert.butyl-peroxy)3-penylpropane | | | | | | 5.9 | | | | | | |
| 2,2-bis(tert.butyl-peroxy)3-benzoylpropane | | | | | | | 6.5 | | | | | |
| 1,1-bis(tert.butyl-peroxy)-ethane | | | | | | | | 4.2 | | | | |
| Bis(tert.butyl-peroxy)-phenyl-methane | | | | | | | | | 5.4 | | | |
| Bis(tert.butyl-peroxy)-(2-furyl)methane | | | | | | | | | | 5.2 | | |
| Di-cumyl-peroxide | | | | | | | | | | | 2.7 | |
| Di-phenyl-granidine | | | | | | | | 1 | | | | |
| Tert.butyl-perbenzoate | | | | | | | | | | | | 2 |
| Vulcanization conditions, (° C.) | 150 | 150 | 150 | 150 | 150 | 150 | 150 | 150 | 150 | 150 | 165 | 150 |
| Minutes | 30 | 30 | 30 | 30 | 30 | 30 | 30 | 30 | 30 | 30 | 30 | 40 |
| Mechanical characteristics: | | | | | | | | | | | | |
| Tensile strength, kg./cm.$^2$ | 150 | 143 | 150 | 173 | 171 | 129 | 133 | 140 | 115 | 91 | 150 | 25 |
| Elongation at break, percent | 340 | 390 | 340 | 375 | 380 | 458 | 375 | 420 | 365 | 335 | 470 | 320 |
| Modulus at 200% elongation, kg./cm.$^2$ | 74 | 59 | 77 | 75 | 71 | 39 | 59 | 54 | 61 | 57 | | |
| Modulus at 300% elongation, kg./cm.$^2$ | 131 | 107 | 120 | 130 | 119 | 66 | 102 | 93 | 96 | 78 | 80 | |
| Residual elongation at 200% | 10 | 10 | 10 | 12.5 | 10 | 14 | 10 | 12 | 14 | 18 | 11 | |
| Odor level of the vulcanizates [1] | 4 | 4 | 3 | 4 | 3 | 3 | 3 | 3 | 3 | 3 | 1 | |

[1] Odor level:
  1 Offensive persistent (months).
  2 Offensive transitory (a few days).
  3 Not offensive.
  4 No odor.

The residual elongation was determined on special specimens having a useful portion of 5 cc., kept under a tension of 200% for 1 hour, and measured one minute after their release.

The results are reported in Table 1.

EXAMPLE 2

With the ethylene-propylene copolymer described in Example 1, a mix having the following composition was prepared:

| | Parts |
|---|---|
| Ethylene-propylene copolymer | 100 |
| HAF carbon black | 50 |
| Sulfur | 1.3 |
| Diphenylguanidine | 1 |
| 2,2-bis(tert.butyl-peroxy)propane | 4.4 |

The mix was vulcanized in a press for different times at 150° C., and according to the methods described in Example 1. The mechanical characteristics of the vulcanized products were determined and are reported in Table 2.

Table 2

| Vulcanization time, minutes | Tensile strength, kg./cm.$^2$ | Elongation at break, Percent | Modulus at 300%, kg./cm.$^2$ | Residual elongation, Percent |
|---|---|---|---|---|
| 5 | 72 | 770 | 27 | 29 |
| 10 | 110 | 625 | 40 | 20 |
| 15 | 161 | 545 | 76 | 11 |
| 20 | 177 | 490 | 83 | 8.5 |
| 25 | 186 | 460 | 108 | 8 |
| 35 | 180 | 435 | 117 | 8 |
| 40 | 170 | 425 | 120 | 8 |
| 45 | 170 | 425 | 115 | 8 |

EXAMPLE 3

The mix of Example 2, containing 2,2-bis(tert.butyl-peroxy)-propane (t.B.P.P.) was used for the continuous determination, by means of a curometer, of the variations in the shear modulus with the progress of the vulcanization. The percentages of the maximum value of this modulus measured at different times with different temperatures are reported in Table 3, in comparison with dicumyl-peroxide (P.C.).

Table 3

Percent maximum value of the shear modulus

| Time, minutes | 145° C. | | 155° C. | | 165° C. | |
|---|---|---|---|---|---|---|
| | t.B.P.P. | P.C. | t.B.P.P. | P.C. | t.B.P.P. | P.C. |
| 2 | 18 | ([1]) | 21 | ([1]) | 30 | ([1]) |
| 4 | 25 | 16.5 | 38 | 22.5 | 63.5 | 32.5 |
| 6 | 34 | 20 | 54 | 33.5 | 81 | 51 |
| 8 | 42 | 27.5 | 66 | 46.5 | 89.5 | 70 |
| 10 | 49.5 | 33 | 75 | 57 | 94 | 81 |
| 12 | 54 | 39 | 82 | 66 | 97 | 88 |
| 14 | 60 | 43.5 | 86 | 73 | 98.5 | 93 |
| 16 | 65 | 48.5 | 89.5 | 78.5 | 99 | 95.5 |
| 18 | 70 | 53.5 | 92 | 82.5 | 100 | 97 |
| 20 | 73 | 57.5 | 94 | 85 | | 98 |
| 22 | 76 | 61.5 | 96 | 88.5 | | 99 |
| 24 | 79 | 65 | 97 | 91 | | ([1]) |
| 26 | 82 | 68 | 98 | 93 | | ([1]) |
| 28 | 83 | 71 | 99 | 94 | | 100 |
| 30 | 85 | 74 | 100 | 95 | | |
| 35 | 89.5 | 78.5 | | 96.5 | | |
| 40 | 92 | 83 | | 98 | | |
| 45 | 94 | 86 | | 98.5 | | |
| 50 | 96 | 89 | | 99 | | |
| 60 | 98.5 | 93.5 | | 100 | | |
| 70 | 100 | 96.5 | | | | |
| 90 | | 100 | | | | |

[1] Not determined.

EXAMPLE 4

The preparation of the mixes of Table 4, their vulcanization and the determination of the mechanical characteristics of the vulcanizates were carried out with the ethylene-propylene copolymer and according to the process of Example 1.

Table 4

|  | A | B |
|---|---|---|
| Composition of the mixes (parts by weight): |  |  |
| Ethylene-propylene copolymer | 100 | 100 |
| HAF carbon black (High Abrasion Furnace) | 50 | 50 |
| Sulfur | 1.28 | 1.28 |
| Diphenylguanidine | 0 | 1 |
| 2,2-bis(tert.butyl-peroxy)propane | 4.4 | 4.4 |
| Vulcanization conditions | 150° C. | 150° C. |
| (Temperature and time in minutes) | 30′ | 30′ |
| Mechanical characteristics: |  |  |
| Tensile strength, kg./cm.$^2$ | 142 | 187 |
| Elongation at break, percent | 360 | 420 |
| Modulus at 200% elongation, kg./cm.$^2$ | 75 | 79 |
| Modulus at 300% elongation, kg./cm$^2$ | 122 | 130 |
| Residual elongation at 200%, percent | 10 | 8 |

EXAMPLE 5

The mixes of Table 5 have been prepared with the copolymer of Example 1, containing variable amounts of carbon black of the HAF, SRF or SAF type, sulfur and, as vulcanizing agents, 2,2-bis(tert.butyl-peroxy)propane and 1,1-bis(tert.butyl-peroxy)ethane in comparison with dicumyl-peroxide and with tert.butyl-perbenzoate.

The mechanical characteristics of the vulcanizates, determined according to the process of Example 1, are reported in Table 5.

EXAMPLE 6

The mixes of Table 6 were prepared with an ethylene-propylene copolymer having a Mooney viscosity ML (1+4 100° C.) of 22, channel carbon black and 2,2-bis(tert.butyl-peroxy)propane, in comparison with dicumyl-peroxide and tert.butyl-perbenzoate. The vulcanization and the determination of the mechanical characteristics were carried out according to the modalities reported in Example 1.

Table 6

|  | 1 | 2 | 3 |
|---|---|---|---|
| Compositions of the mixes (parts by weight): |  |  |  |
| Ethylene-propylene copolymer | 100 | 100 | 100 |
| EPC carbon black (Easy Processing Channel) | 50 | 50 | 50 |
| MgO | 2 | 2 | 2 |
| Diphenyl guanidine | 2 | 2 | 2 |
| Sulfur | 0.32 | 0.32 | 0.32 |
| Dicumylperoxide | 2.7 |  |  |
| Tert.butyl-perbenzoate |  | 1.94 |  |
| 2,2-bis(tert.butyl-peroxy)propane |  |  | 2.2 |
| Vulcanization conditions, ° C | 165 | 150 | 150 |
| Minutes | 30 | 30 | 30 |
| Mechanical characteristics: |  |  |  |
| Tensile strength, kg./cm.$^2$ | 170 | (¹) | 171 |
| Elongation at break, percent | 475 | (¹) | 540 |
| Modulus at 300% elongation, kg./cm.$^2$ | 42 | (¹) | 29 |
| Modulus at 300% elongation, kg./cm.$^2$ | 79 | (¹) | 66 |
| Residual elongation at 200%, percent | 10 | (¹) | 16 |

¹ Not vulcanized.

EXAMPLE 7

With an ethylene-propylene copolymer having a Mooney viscosity ML (1+4 100° C.) of 35, the mixes reported in Table 7 were prepared. The vulcanization and the determination of the mechanical characteristics were carried out according to the modalities of Example 1.

Table 5

|  | 1 | 2 | 3 | 4 | 5 | 6 | 7 | 8 | 9 |
|---|---|---|---|---|---|---|---|---|---|
| Composition of the mixes (parts by weight): |  |  |  |  |  |  |  |  |  |
| Ethylene-propylene copolymer | 100 | 100 | 100 | 100 | 100 | 100 | 100 | 100 | 100 |
| HAF carbon black (High Abrasion Furnace) | 2 | 20 | 50 | 1 | 20 | 50 | 50 |  |  |
| SRF carbon black (Semi Reinforcing Furnace) |  |  |  |  |  |  |  | 2 | 20 |
| SAF carbon black (Super Abrasion Furnace) |  |  |  |  |  |  |  |  |  |
| Sulfur | 0.32 | 0.32 | 0.32 | 0.32 | 0.32 | 0.32 | 0.32 | 0.32 | 0.32 |
| 2,2-bis(tert.butyl-peroxy)propane | 2.20 | 2.20 | 2.20 |  |  |  |  | 2.20 | 2.20 |
| 1,1-bis(tert.butyl-peroxy)ethane |  |  |  |  |  |  |  |  |  |
| Dicumyl-peroxide |  |  |  | 2.70 | 2.70 | 2.70 |  |  |  |
| Tert.butyl-perbenzoate |  |  |  |  |  |  | 3.88 |  |  |
| Vulcanization conditions, ° C | 150 | 150 | 150 | 160 | 160 | 160 | 150 | 150 | 150 |
| Minutes | 40 | 40 | 40 | 40 | 40 | 40 | 40 | 40 | 40 |
| Mechanical characteristics: |  |  |  |  |  |  |  |  |  |
| Tensile strength kg./cm.$^2$ | 14 | 96 | 154 | 13 | 93 | 162 | (¹) | 15 | 61 |
| Elongation at break, percent | 575 | 570 | 430 | 390 | 445 | 450 | (¹) | 620 | 600 |
| Modulus at 300% elongation, kg./cm.$^2$ | 8 | 29 | 90 | 10 | 39 | 93 | (¹) | 8 | 21 |
| Residual elongation at 200%, percent | 20 | 15 | 10 |  | 10 | 10 | (¹) | 22 | 16 |

|  | 10 | 11 | 12 | 13 | 14 | 15 | 16 | 17 | 18 |
|---|---|---|---|---|---|---|---|---|---|
| Composition of the mixes (parts by weight): |  |  |  |  |  |  |  |  |  |
| Ethylene-propylene copolymer | 100 | 100 | 100 | 100 | 100 | 100 | 100 | 100 | 100 |
| HAF carbon black (High Abrasion Furnace) |  |  |  |  |  |  |  |  |  |
| SRF carbon black (Semi Reinforcing Furnace) | 50 | 50 | 50 | 50 |  |  |  |  |  |
| SAF carbon black (Super Abrasion Furnace) |  |  |  |  | 2 | 20 | 50 | 50 | 50 |
| Sulfur | 0.32 | 0.32 | 0.32 | 0.32 | 0.32 | 0.32 | 0.32 | 0.32 | 0.32 |
| 2,2-bis(tert.butyl-peroxy)propane | 2.20 |  |  |  | 2.20 | 2.20 | 2.20 |  |  |
| 1,1-bis(tert.butyl-peroxy)ethane |  | 5.2 |  |  |  |  |  |  |  |
| Dicumyl-peroxide |  |  | 2.70 |  |  |  |  | 2.70 |  |
| Tert.butyl-perbenzoate |  |  |  | 3.88 |  |  |  |  | 3.88 |
| Vulcanization conditions, ° C | 150 | 150 | 160 | 150 | 150 | 150 | 150 | 160 | 150 |
| Minutes | 40 | 30 | 40 | 40 | 40 | 40 | 40 | 40 | 40 |
| Mechanical characteristics: |  |  |  |  |  |  |  |  |  |
| Tensile strength, kg./cm.$^2$ | 110 | 99 | 97 | 110 | 21 | 85 | 162 | 183 | (¹) |
| Elongation at break, percent | 475 | 365 | 385 | 293 | 655 | 530 | 480 | 490 | (¹) |
| Modulus at 300% elongation, kg./cm.$^2$ | 62 | 73 | 79 | (²) | 8 | 27 | 75 | 78 | (¹) |
| Residual elongation at 200%, percent | 10 | 10 | 8 | (²) | 20 | 16 | 14 | 12 | (¹) |

¹ Not vulcanized.
² Break.

Table 7

|  | 1 | 2 | 3 | 4 | 5 | 6 |
|---|---|---|---|---|---|---|
| Compositions of the mixes (parts by weight): | | | | | | |
| Ethylene propylene copolymer | 100 | 100 | 100 | 100 | 100 | 100 |
| HAF carbon black (High Abrasion Furnace) | 50 | 50 | 50 | 50 | 50 | 50 |
| 2,2-bis(tert. butyl-peroxy) propane | 2.2 | 2.2 | 2.2 | 2.2 | 2.2 | 2.2 |
| Sulfur | 0.32 | | | | | |
| Quinonedioxime | | 1.38 | | | | |
| Dibenzoylquinonedioxime | | | 3.46 | | | |
| Triallyl cyanurate | | | | 2.5 | | |
| N,N'-p-phenylendimaleimide | | | | | | 2.74 |
| N,N-hexamethylenedimaleimidic acid | | | | | 3.12 | |
| Vulcanization conditions, °C | 150 | 150 | 150 | 150 | 150 | 150 |
| Minutes | 30 | 30 | 30 | 30 | 30 | 30 |
| Mechanical characteristics: | | | | | | |
| Tensile strength, kg./cm.$^2$ | 164 | 135 | 155 | 138 | 145 | 107 |
| Elongation at break, percent | 380 | 430 | 205 | 283 | 268 | 237 |
| Modulus at 200% elongation, kg./cm.$^2$ | 63 | 50 | 42 | 90 | 93 | 85 |
| Modulus at 300% elongation, kg./cm.$^2$ | 120 | 89 | | | | |
| Residual elongation at 200%, percent | 10 | 20 | (¹) | 10 | 9.5 | 12 |

¹ Break.

EXAMPLE 8

In a 100 cc. flask provided with an agitator and cooled to about 0° C., were reacted 0.1 mol of 1-hydroxy-1-tert. butyl-peroxy-ethane with 0.15 mols of tert.butyl hydroperoxide, in the presence of 5 g. anhydrous calcium chloride, as a dehydrating agent, and 20 cc. of 35% perchloric acid. After one hour of reaction at 0° C., the reaction mixture was poured into water. The organic layer was separated, washed until a neutral pH was reached (two washings with water, one with a 10% NaOH solution and then various aqueous washings), dried on anhydrous calcium chloride and rectified under vacuum (boiling point 68°–70° C. under 4.5 mm. Hg).

The obtained product was 1,1-bis(tert.butyl-peroxy) ethane having a density of 0.875 at 20° C. and a content of active oxygen of 14.6% (calculated 15.4%).

The 1-hydroxy-1-tert.butyl-peroxy-ethane used as a starting material was prepared in the following manner. 20 parts by volume of acetaldehyde, 5 parts by volume of tert.butyl hydroperoxide and 10 parts by volume of concentrated hydrochloric acid were mixed together with a small amount of calcium chloride and allowed to react at a temperature below 5° C. The organic layer was separated and found to have a refractive index of $n_D^{20} = 1.4110$.

EXAMPLE 9

A mixture of 0.1 mols of chloro-acetone and 0.15 mols of tert.butyl hydroperoxide was introduced into a 100 cc. flask provided with an agitator and cooled at about 0° C. with an external cooling bath. 5 g. of anhydrous calcium chloride were added and then 5 cc. of concentrated HCl were slowly added, taking care that the inner temperature did not exceed 10° C. The reaction was continued for one hour and the reaction mixture was then poured into water. The organic layer was washed many times with water, a 10% NaOH solution, and water again until a neutral pH was reached. In order to separate the perketal that is formed from the non-reacted chloro-acetone, one of the following two methods was followed for separating portions of the washed organic layer:

(1) repeated washing with a 50:50 water-methanol mixture and then with water followed by drying with granular anhydrous calcium chloride, or (2) drying of the crude product on anhydrous calcium chloride followed by rectification under vacuum.

In each case, the separated product was 2,2-bis(tert. butyl-peroxy)-3-chloro-propane having a refractive index of $n_D^{20} = 1.4128$, a density at 20° C. of 0.9185, a content of active oxygen of 15.3% (calculated 12.5%), a boiling point of 75°–77° C. under 3 mm. Hg and a molecular weight of 243 (calculated 265.5).

EXAMPLE 10

A mixture of 0.1 mols of phenyl-acetone and 0.15 mols of tert.butyl hydroperoxide was introduced into a 100 cc. flask provided with an agitator and cooled to about 0° C. with an external cooling bath. 5 g. of anhydrous calcium chloride were added and then 5 cc. of concentrated HCl were slowly added, taking care that the inner temperature did not exceed 10° C. The reaction was continued for one hour and the reaction mixture was then poured into water. The organic layer was washed many times with water, a 10% NaOH solution, and water again until a neutral pH was reached. In order to separate the perketal that is formed, from the non-reacted phenyl-acetone, one of the following two methods was followed for separating portions of the washed organic layer:

(1) repeated washing with a 50:50 water-methanol mixture and then with water followed by drying with granular calcium chloride, or (2) drying of the crude product on anhydrous calcium chloride followed by rectification under vacuum.

In each case, the separated product was a 2,2-bis(tert. butyl-peroxy)-3-phenyl-propane having a refractive index of $n_D^{20} = 1.4831$, a density at 20° C. of 0.9210, a content of active oxygen of 10.1% (calculated 10.8%) and a molecular weight of 288 (calculated 294).

EXAMPLE 11

A mixture of 0.1 mols of benzoyl-acetone and 0.15 mols of tert.butyl hydroperoxide was introduced into a 100 cc. flask provided with an agitator and cooled to about 0° C. with an external cooling bath. 5 g. of anhydrous calcium chloride were added and then 5 cc. of concentrated HCl were slowly added, taking care that the inner temperature did not exceed 10° C. The reaction was continued for one hour and the reaction mixture was then poured into water. The organic layer was washed many times with water, a 10% NaOH solution, and water again until a neutral pH was reached. In order to separate the perketal that is formed, from the non-reacted benzoyl-acetone, one of the following two methods was followed for separating portions of the washed organic layer:

(1) repeated washing with a 50:50 water-methanol mixture and then with water followed by drying with granular calcium chloride, or (2) drying of the crude product on anhydrous calcium chloride followed by rectification under vacuum.

In each case, the separated product was 2,2-bis(tert. butyl-peroxy)-3-benzoyl-propane having a density at 20° C. of 0.9040, a content of active oxygen of 8.9% (calculated 9.9) and a molecular weight of 330 (calculated 324).

EXAMPLE 12

A mixture of 0.1 mols of furfural and 0.15 mols of tert.butyl hydroperoxide was introduced into a 100 cc. flask provided with an agitator, and cooled to about 0° C. with an external cooling bath. 5 g. of anhydrous calcium chloride were added and then 5 cc. of concentrated HCl were slowly added, taking care that the inner temperature did not exceed 10° C. The reaction was continued for one hour and the reaction mixture was then poured into water. The organic layer was washed many times with water, a 10% NaOH solution, and water again until a neutral pH was reached. In order to separate the peracetal that is formed from the non-reacted furfural, one of the following two methods was followed for separating portions of the washed organic layer:

(1) repeated washing with a 50:50 water-methanol mixture and then with water followed by drying with granular calcium chloride, or (2) drying of the crude product on anhydrous calcium chloride followed by rectification under vacuum.

In each case, the separated product was bis(tert.butyl-peroxy)-(2-furyl)-methane having a density at 20° C. of 0.9712, a content of active oxygen of 12.2% (calculated 12.4%) and a molecular weight of 247 (calculated 258).

EXAMPLE 13

Into a reactor provided with an effective agitator, was introduced a solution of 5.6 g. of 1,4-cyclohexandione and 36 g. of tert-butyl hydroperoxide in 50 cc. of n-hexane. To this mixture, vigorously agitated and kept at about 0° C., were added 8 g. of ground calcium chloride and 15 cc. of conc. HCl (D=1.8). The introduction of HCl had to be carried out gradually so as to keep the temperature between 0° and 5° C. The mixture was then kept in agitation for 1 hour, while always kept at a temperature of 0° C. A partial separation of the peroxide in the crystalline state occurred.

After dilution with 100 cc. of ice-cold water, the lower aqueous layer was separated. The upper slurry was then washed with a 4% NaOH solution and then with water until a neutral pH was reached. The neutral organic slurry was then heated at about 50° C. until complete dissolution was obtained, and was then cooled to 0° C. The peroxide precipitated and was then filtered on a Buchner funnel.

16 g. of 1,1,4,4-tetra(tert.butyl-peroxy)cyclohexane

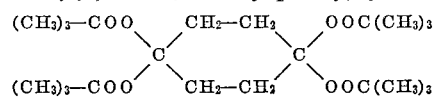

having a melting point of 136°–137° C. (with decomposition) were thus obtained.

The analysis gave the following values:

C=59.46% (calculated for $C_{22}H_{44}O_8$=60.52%)
H=9.96% (calculated for $C_{22}H_{44}O_8$=10.16%)
Active O=13.46% (calculated for $C_{22}H_{44}O_8$=14.66%)

EXAMPLES 14–16

With an ethylene-propylene copolymer having an ethylene molar content of 50% and a Mooney viscosity (ML (1+4) at 100° C.) of 35, the mixes of Table 8 were prepared.

Table 8

| | Ex. 14 | Ex. 15 | Ex. 16 | Comparison mix A | Comparison mix B |
|---|---|---|---|---|---|
| Composition of the mix (parts by weight): | | | | | |
| Ethylene-propylene copolymer | 100 | 100 | 100 | 100 | 100 |
| HAF carbon black | 50 | 50 | 50 | 50 | 50 |
| 1,1,4,4-tetra(tert.butyl-peroxy)cyclohexane | 2.5 | 2.5 | 2.5 | | |
| Cumyl peroxide | | | | 2.7 | |
| 2,2,5,5-tetra(tert.butyl-peroxy)hexane | | | | | 2.43 |
| Sulfur | 0.32 | 0.32 | 0.32 | 0.32 | 0.32 |
| ZnO | | | 1 | | |
| Vulcanization in a press: | | | | | |
| Temperature, °C | 150 | 150 | 140 | 165 | 150 |
| Time, minutes | 20 | 20 | 40 | 30 | 40 |
| Mechanical characteristics: | | | | | |
| Tensile strength, kg./cm.² | 150 | 165 | 152 | 179 | 165 |
| Elongation at break, percent | 405 | 365 | 435 | 430 | 415 |
| Modulus at 300%, kg./cm.² | 106 | 124 | 104 | 113 | 108 |
| Residual elongation (1 hour of elongation at 200%, reading after 1 minute) | 12 | 10.5 | 11 | 8.5 | 10.5 |
| Vulcanization rate determined in a curometer [1]: | | | | | |
| Temperature, °C | 150 | 150 | | 165 | 150 |
| Time, minutes | 17 | 18 | | 25 | 36 |

[1] (See J. Peter and W. Heidemann; Kautschuk u. Gummi: 10 (1957), Wissenschaft u. Technik, p. 168; 11 (1958), Wissenschaft u. Technik, p. 159).

What is claimed is:

1. Vulcanizable compositions containing a polymer selected from the group consisting of olefin polymers and ethylene alpha-olefin copolymers together with a reinforcing filler and a peroxide selected from the group consisting of peroxides having the formula

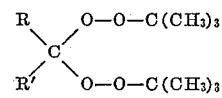

in which R and R' are alkyls, substituted alkyls, saturated cycloalkyls, unsaturated cycloalkyls, aralkyl and hydrogen atoms, and peroxides having the formula

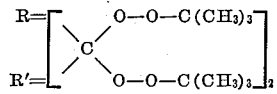

in which R and R' are bivalent alkylenic radicals containing from 2 to 8 carbon atoms and in which the resulting cyclic structure contains from 6 to 12 carbon atoms.

2. The vulcanizable compositions of claim 1 which, characterized further contain a basic substance acting as free-radical acceptor.

3. The vulcanizable compositions of claim 1 which, characterized further contain a basic substance and an auxiliary vulcanization substance acting as free-radical acceptor.

4. The vulcanizable compositions of claim 1 which, characterized further contain an auxiliary vulcanization substance acting as free-radical acceptor.

5. The vulcanizable compositions of claim 1 wherein the peroxide is present in amounts from 0.1 to 10 parts by weight per 100 parts of polymer.

6. The vulcanizable compositions of claim 1 which further include a basic substance selected from the group consisting of metal oxides, amines and diphenylguanidine in amounts between 0.1 and 10 parts per 100 parts of polymer.

7. The vulcanizable compositions of claim 4 wherein auxiliary vulcanization substance is selected from the group consisting of sulfur, quinonic compounds, compounds containing at least one vinyl group, compounds containing at least one allyl group, polymers containing vinyl unsaturations, dimaleimides, furfural and their derivatives and is present in amounts of between 0.01 and 10 parts by weight per 100 parts of polymer.

8. The vulcanizable compositions of claim 7 wherein sulfur is used as the auxiliary substance in amounts between 0.1 and 4 parts by weight per 100 parts of polymer.

9. The vulcanizable compositions of claim 7 wherein sulfur is used as the auxiliary substance in amounts between 0.3 and 2 parts by weight per 100 parts of polymer.

10. The vulcanization compositions of claim 8 wherein diphenylguanidine is used together with sulfur.

11. The vulcanizable compositions of claim 1 wherein the reinforcing filler is carbon black.

12. The vulcanizable compositions of claim 1 wherein the ethylene alpha-olefin copolymer is a saturated amorphous ethylene-propylene copolymer having an ethylene molar content of between 20 and 80%.

13. The vulcanizable compositions of claim 1 wherein the peroxide is 2,2-bis(tert.butyl-peroxy)-propane.

14. The vulcanizable compositions of claim 1 wherein the peroxide is 2,2-bis(tert.butyl-peroxy)-3-chloro-propane.

15. The vulcanizable compositions of claim 1 wherein the peroxide is 2,2-bis(tert.butyl-peroxy)-1,3-dichloropropane.

16. The vulcanizable compositions of claim 1 wherein the peroxide is 2,2-bis(tert.butyl-peroxy)-3-phenyl-propane.

17. The vulcanizable compositions of claim 1 wherein the peroxide is 2,2-bis(tert.butyl-peroxy)-3-benzo-propane.

18. The vulcanizable compositions of claim 1 wherein the peroxide is 2,2-bis(tert.butyl-peroxy)-pentanone-4.

19. The vulcanizable compositions of claim 1 wherein the peroxide is 2,2-bis(tert.butyl-peroxy)-butane.

20. The vulcanizable compositions of claim 1 wherein the peroxide is alpha,alpha-bis(tert.butyl-peroxy)ethylbenzene.

21. The vulcanizable compositions of claim 1 wherein the peroxide is alpha,alpha-bis(tert.butyl-peroxy)diphenylmethane.

22. The vulcanizable compositions of claim 1 wherein the peroxide is alpha,alpha-bis(tert.butyl-peroxy)-2-ethylfurane.

23. The vulcanizable compositions of claim 1 wherein the peroxide is bis(tert.butyl-peroxy)-methane.

24. The vulcanizable compositions of claim 1 wherein the peroxide is 1,1-bis(tert.butyl-peroxy)-ethane.

25. The vulcanizable compositions of claim 1 wherein the peroxide is alpha,alpha-bis(tert.butyl-peroxy)-toluene.

26. The vulcanizable compositions of claim 1 wherein the peroxide is alpha,alpha-bis(tert. butyl-peroxy)-2-methylfurane.

27. The vulcanizable compositions of claim 1 wherein the peroxide is 1,1,4,4-tetra(tert.butyl-peroxy)-cyclohexane.

28. The vulcanizable compositions of claim 1 wherein the peroxide is 1,1,5,5-tetra(tert.butyl-peroxy)cyclooctane.

29. The vulcanizable compositions of claim 1 wherein the peroxide is 1,1,7,7-tetra(tert.butyl-peroxy)-cyclo-dodecane.

30. The vulcanizable compositions of claim 1 wherein the peroxide is 1,1,4,4-tetra(tert.butyl-peroxy)-cyclo-dodecane.

31. Vulcanized articles obtained from the vulcanizable compositions of claim 1.

32. A peroxide selected from the group consisting of 1,1 - bis(tert.butyl - peroxy) - ethane, 2,2 - bis(tert.butyl-peroxy)-3-chloro - propane, 2,2 - bis(tert.butyl-peroxy-3-phenyl - propane, 2,2 - bis(tert.butyl-peroxy)-3-benzoyl propane, bis(tert.butyl-peroxy)-(2-furyl)-methane and a tetraperoxide having the general formula

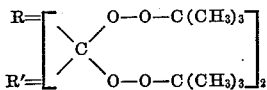

in which R and R′ are bivalent alkylenic radicals containing from 2 to 8 carbon atoms and in which the resulting cyclic structure contains from 6 to 12 carbon atoms.

33.

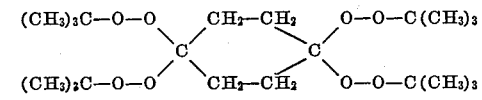

No references cited.

MORRIS LIEBMAN, *Primary Examiner.*

J. S. WALDRON, *Assistant Examiner.*